(12) United States Patent
Yasuda et al.

(10) Patent No.: US 7,805,074 B2
(45) Date of Patent: Sep. 28, 2010

(54) PACKAGE STARTING CONTROL DEVICE

(75) Inventors: Takashi Yasuda, Yokohama (JP); Satoshi Yasutaka, Yokohama (JP); Seiji Meki, Yokohama (JP); Tomonori Gotoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 786 days.

(21) Appl. No.: 11/044,994

(22) Filed: Jan. 28, 2005

(65) Prior Publication Data

US 2006/0067687 A1   Mar. 30, 2006

(30) Foreign Application Priority Data

Sep. 27, 2004 (JP) ............................. 2004-279322

(51) Int. Cl.
*H04B 10/08* (2006.01)
*H04B 17/00* (2006.01)

(52) U.S. Cl. .................. 398/9; 398/15; 398/17; 398/33; 398/34

(58) Field of Classification Search .......... 398/7, 398/9–38, 79, 140, 141, 151; 372/29; 359/341, 359/342
See application file for complete search history.

(56) References Cited

U.S. PATENT DOCUMENTS 6,268,945 B1 * 7/2001 Roberts ...................... 398/38
7,092,630 B2 * 8/2006 Cunningham et al. ......... 398/15
2003/0095303 A1 * 5/2003 Cunningham et al. ....... 359/110
2003/0147123 A1 * 8/2003 Kinoshita et al. ......... 359/341.3
2005/0169327 A1 * 8/2005 Eden et al. ............... 372/29.02
2006/0024058 A1 * 2/2006 Nabeyama et al. ............ 398/79

FOREIGN PATENT DOCUMENTS

JP    2002-246986    8/2002

* cited by examiner

*Primary Examiner*—Li Liu
(74) *Attorney, Agent, or Firm*—Hanify & King, PC

(57) ABSTRACT

The invention relates to a package starting control device determining a moment and a sequence of starting a package corresponding to an individual wavelength to be wavelength-division-multiplexed in a wavelength division multiplex transmission device. An object of the invention is to provide a package starting control device capable of effectively increasing or decreasing the number of wavelengths at low cost without changing a basic structure drastically. The package starting control device is constructed such that operational states of optical modules that generate optical signals wavelength-division-multiplexed into wavelength division multiplexed optical signals are monitored, the optical signal output by packages that generate the optical signals wavelength-division-multiplexed into the wavelength division multiplexed optical signals during a period when any of the operational states is not in a steady state is restricted and the restriction of the optical signal output by one package of the packages each time the period elapses is released.

4 Claims, 7 Drawing Sheets

PACKAGE STARTING CONTROL DEVICE

CROSS-REFERENCE TO RELATED APPLICATIONS

This application is based upon and claims the benefit of priority from Japanese Patent Application No. 2004-279322, filed on Sep. 27, 2004, the entire contents of which are incorporated herein by reference.

BACKGROUND OF THE INVENTION

1. Field of the Invention

The present invention relates to a package starting control device for determining a moment and a sequence of starting a package that corresponds to an individual wavelength to be a subject of wavelength division multiplexing in a wavelength division multiplex transmission device.

2. Description of the Related Art

Since a wavelength division multiplex transmission system commonly uses an optical fiber having a low loss even in a wide band with asynchrony at plural wavelengths so that the wavelength division multiplex transmission system is suitable for transmission of various digital and analog signals having a large capacity and for a flexible construction of a network, it is widely applied to many basic transmission lines.

FIG. 6 is a diagram illustrating an example of a structure of an optical transmission system to which a wavelength division multiplex transmission system is applied.

In FIG. 6, WDM transmission devices 30-1 and 30-2 are connected to one end and the other end of a full duplex optical transmission line 31, respectively. Client transmission devices 30C-11 to 30C-1n and client transmission devices 30C-21 to 30C-2n are connected to the above-mentioned WDM transmission devices 30-1 and 30-2, respectively.

In the WDM transmission device 30-1, transponder packages (TRPN) 32-11 to 32-1n are connected to the client transmission devices 30C-11 to 30C-1n. Optical output terminals of the transponder packages 32-11 to 32-1n are connected to corresponding input terminals of a wavelength division multiplexer (MUX) 33-1, and an output terminal of the wavelength division multiplexing unit 33-1 is connected to one end of a downstream link of an optical transmission line 31 through a postpackage (PST) 34-1. One end of an upstream link of the optical transmission line 31 is connected to an optical input terminal of a prepackage (PRE) 35-1, and an output terminal of the prepackage 35-1 is connected to an input terminal of a wavelength division demultiplexer (DMUX) 36-1. First to n-th output terminals of the wavelength division demultiplexer 36-1 are connected to optical input terminals of the transponder packages 32-11 to 32-1n, respectively. In addition, control terminals of the transponder packages 32-11 to 32-1n, the wavelength division multiplexer 33-1, the postpackage 34-1, the prepackage 35-1, and the wavelength division demultiplexer 36-1 are connected to a bus terminal of a processor 38-1 (CPU) through an internal bus 37-1.

In addition, a structure of the WDM transmission device 30-2 is the same as that of the WDM transmission device 30-1. Therefore, in the following description, corresponding constituent elements are denoted by the same reference numeral to which a first appended number '2' is attached and the description thereof is omitted.

In addition, in the following description, on common matters of the WDM transmission devices 30-1 and 30-2, their descriptions will be made using reference numerals to which an appended character 'C' corresponding to any one of first appended numbers '1' and '2' is attached as their first appended character.

In addition, in the following description, on common matters of transponder packages 32-C1 to 32-Cn, their descriptions will be made using reference numerals to which an appended character 'c' corresponding to any one of second appended numbers '1' to 'n' is attached as their second appended character.

In the optical transmission system having the above-mentioned structure, for example, a processor 38-C instructs a TRPN 32-Cc to start in accordance with a request (hereinafter, referred to as 'an initial setting command') instructed by an operator through a terminal device (not shown) in a state in which the TRPN 32-Cc, a postpackage 34-C, and a prepackage 35-C are respectively mounted on a WDM transmission device 30-C.

The TRPN 32-Cc starts in accordance with the request and performs an initial setting (FIG. 7(1)) suitable for office data and each configuration of hardware. After that, the TRPN 32-Cc waits in a state in which the optical signal can be output (hereinafter, referred to as a shutdown state) (FIG. 7(2)).

In addition, the processor 38-C waits for a command (hereinafter, 'a shutdown release command') instructed by the operator and transmits 'the shutdown release command' to the TRPN 32-Cc, similarly to the above-mentioned request to the TRPN 32-Cc (FIG. 7(3)).

The TRPN 32-Cc initiates the driving of a built-in optical module in accordance with the transmitted 'shutdown release command' as described above (FIG. 7(4)).

The transponder package 32-Cc converts a signal supplied from a client transmission device 30C-Cc into an optical signal, to which wavelength division multiplexing can be made, through an electric-optic conversion. A wavelength division multiplexer 33-C wavelength division multiplexes the optical signals having n different wavelengths output by the transponder packages 32-C1 to 32-Cn as a result of the electric-optic conversion to thus produce WDM signals. The postpackage 34-C amplifies the WDM signals to output them to the downstream link of the optical transmission line 31.

The prepackage 35-C amplifies the WDM signals input through the upstream link of the optical transmission line 31 to supply them to a wavelength division demultiplexer 36-C. The wavelength division demultiplexer 36-C subjects the WDM signal to a wavelength division demultiplexing to obtain n optical signals having different wavelengths. The transponder package 32-Cc subjects a corresponding optical signal among the n optical signals to the optic-electric conversion to generate a signal, and delivers it to the client transmission device 30C-Cc.

In addition, in a state in which, for example, the transponder package 32-C1 is not mounted on the WDM transmission device among the transponder packages 32-C1 to 32-Cn, and the postpackage 34-C and the prepackage 35-C normally operate together with the transponder packages 32-C2 to 32-Cn other than transponder package 32-C1, when the transponder package 32-C1 (herein, it is assumed that the transponderpackage 32-C1 can be hot-plugged on a WDM transmission device 30-C through a connector) is newly mounted on the WDM transmission device 30-C, each unit operates as follows.

The processor 38-C instructs the transponder package 32-C1 to start in accordance with 'an initial setting command' instructed by an operator in a state in which the transponderpackage 32-C1 is mounted on the WDM transmission device 30-C, as described above.

In addition, the processor 38-C transmits 'the shutdown release command' instructed by the operator to the transponder package 32-C1, and transmits a message (hereinafter, referred as to a wavelength number increase/decrease setting request) indicating the purport to the postpackage 34-C and the prepackage 35-C.

The transponder package 32-C1 starts a normal operation accompanying the output of an optical signal (an optical signal modulated with the signal supplied from the client transmission device 30C-C1) having a predetermined wavelength of λ1 in accordance with 'the shutdown release command'.

When the postpackage 34-C identifies 'the wavelength number increase/decrease setting request', the postpackage 34-C notifies the other WDM transmission device connected to the WDM transmission device 30-C, through the downstream (upstream) link of the optical transmission line 31, of [the addition of the wavelength λ1 (herein, it is assumed that the wavelength λ1 is identified as information included in 'the wavelength number increase/decrease setting request') in a wavelength band].

The postpackage 34-C delivers to the processor 38-C a response (hereinafter, referred to as 'a wavelength number increase/decrease response', and it is assumed that the response is received through the upstream (downstream) link of the optical transmission line) to the notification of the addition of the wavelength λ1 from the other WDM transmission device.

The processor 38-C transmits 'the wavelength number increase/decrease response' to the transponder package 32-C1, and at the time of identifying 'the wavelength number increase/decrease response', the transponder package 32-C1 completes the wavelength number increase/decrease setting according to the increase of the wavelength number (multiplicity) due to the addition of the optical signal having the wavelength λ1.

In addition, an example of a conventional art related to the present invention is disclosed in Patent Document 1 described below. According to Patent Document 1, a method for controlling an optical attenuator in an optical amplifier that, in a wavelength-multiplexed optical network having the optical amplifier, an amplifying unit for amplifying the wavelength-multiplexed optical signal has a gain held constantly, attenuation of a variable optical attenuator set in an optical amplifier used for adjusting a level of the wavelength-multiplexed optical signal is generally set to have a fixed value, the optical attenuation is adjusted such that only when wavelength number information functioning as control information is input, a value of an optical output monitor at a specific location at which the set value of the variable optical attenuator reflects the optical attenuation of the optical attenuator becomes a predetermined value represented from the wavelength number information, and the optical attenuation is held at the state obtained by the adjustment until a next wavelength number information is input, is disclosed.

[Patent Document 1] Japanese Unexamined Patent Application Publication No. 2002-246986

However, in the above-mentioned conventional example, the wavelength number increase/decrease setting according to the addition/removal of the transponder package is performed for each transponder package to be an subject of the addition/removal in accordance with 'the initial setting command' and 'the shutdown release command' instructed by an operator, and the operator must determine a moment issuing 'the initial setting command' and 'the shutdown release command' sufficiently in consideration of characteristics of the corresponding transponder package as well as a structure of a network including the WDM transmission device 30-C and the optical transmission line 31.

In addition, since there exist a variation in the characteristics (including a warming-up time of from several tens of seconds to several minutes required for the optical module for generating the optical signal to normally operate) of the transponder package to be a subject of the addition or removal, a sufficient waiting time must be ensured such that the transponder package can suitably respond ((5) of FIG. 7).

As a result, a manipulation which is performed by the operator taking charge of a work related to the maintenance or operation as described above becomes complicated as the number of the added or exchanged transponder packages increases, and the long time is necessary to ensure the waiting time.

SUMMARY OF THE INVENTION

Accordingly, the present invention has been made to solve the above-mentioned problems, and it is an object of the present invention to provide a package starting control device capable of effectively increasing or decreasing the number of wavelengths at a low cost without changing a basic structure drastically.

Further, it is another object of the present invention to provide a package starting control device capable of reducing a work related to the maintenance or operation, suppressing a deterioration of a transmission or service quality in the course of an increase, an exchange and a modification of the package, and collectively increasing a reliability of an optical transmission system or network to which the present invention is applied.

Further, it is still another object of the present invention to provide a package starting control device capable of automatically starting sequentially optical modules or packages of driving the optical modules without requiring a complicated work even when the optical modules and the packages of driving the optical modules are plural and a time required to normally output optical signals by the optical modules is much different.

Further, it is still another object of the present invention to provide a package starting control device capable of automatically starting sequentially optical modules or packages of driving the optical modules without requiring a complicated work even when a time necessary for a response to an increase or decrease of a multiplicity of a wavelength division multiplexing is long or is much variable.

Further, it is still another object of the present invention to provide a package starting control device capable of quickly starting each package.

Further, it is still another object of the present invention to provide a package starting control device capable of simplifying a sequence of a control related to the starting of packages and improving the performance and added value.

A summary of the present invention is as follows.

According to a first aspect of the present invention, a monitoring unit monitors operational states of optical modules each of which generates each optical signal which is subjected to a wavelength-division-multiplexing to form a wavelength division multiplexed optical signal. A control unit restricts output of the optical signals from packages that generate the optical signals further subjected to a wavelength-division-multiplexing to form the wavelength division multiplexed optical signals during a period in which any of the operational states monitored by the monitoring unit is not in a steady state, and releases the restriction on the output of the optical signals from one package out of the packages each time the period elapses.

Specifically, at a period when all the optical modules monitored by the monitoring unit do not output the optical signals normally, the packages for generating new optical signals to be a subject of a wavelength division multiplexing together with the optical signals are restricted in outputting the new optical signals. In addition, the packages for generating the new optical signals are allowed to output the corresponding new optical signals one by one each time the period elapses.

Therefore, even when the number of the packages for generating the new optical signals individually is plural and the time required to output the optical signals normally is much different, the packages are automatically started sequentially without requiring a complicated work.

According to a second aspect of the present invention, a monitoring unit monitors operational states of optical modules each of which generates each optical signal which is subjected to a wavelength-division-multiplexing to form a wavelength division multiplexed optical signal. A control unit restricts the driving of the optical modules by packages which drive the optical modules that generate optical signals further subjected to a wavelength-division-multiplexing to form the wavelength division multiplexed optical signal during a period in which any of the operational states monitored by the monitoring unit is not in a steady state, and releases the restriction on the driving of the optical modules by one package out of the packages each time the period elapses.

Specifically, at a period when all the optical modules monitored by the monitoring unit do not output the optical signals normally, the packages of driving the optical modules for generating new optical signals to be a subject of a wavelength division multiplexing together with the optical signals are restricted in driving the optical modules. In addition, the packages of driving the optical modules for generating the new optical signals are allowed to drive the corresponding optical modules one by one each time the period elapses.

Therefore, even when the number of the packages driving the optical modules individually for generating the new optical signals is plural and the time required for the corresponding optical modules to output the optical signals normally is much different, the packages are automatically started sequentially without requiring a complicated work.

According to a third aspect of the present invention, the monitoring unit monitors an operational state of a transmission unit for transmitting the wavelength division multiplexed optical signal to an optical transmission line.

Specifically, in the periods in the first and second aspects of the present invention, a period when the operational state of the transmission unit for transmitting the wavelength division multiplexed optical signal to the optical transmission line is not in a steady state is included.

Therefore, even when a time necessary for the operational state of the transmission unit being restored to the steady state in accordance with an increase of the multiplicity of the wavelength division multiplexing is long or is much variable, the optical modules for generating the new optical signals or the packages for driving the optical modules are automatically started sequentially without requiring a complicated work.

According to a fourth aspect of the present invention, the monitoring unit detects a specific optical module which is not mounted or excluded from a system configuration from the optical modules whose operational states are monitored. The control unit suspends the release of the restriction until the operational state of the transmission unit becomes the steady state when the specific optical module is detected by the monitoring unit.

Specifically, in the periods in the first and second aspects of the present invention, a period when the operational state of the transmission unit for transmitting the wavelength division multiplexed optical signal to the optical transmission line is not in a steady state is included.

Therefore, even when the time necessary for the operational state of the transmission unit being restored to the steady state in accordance with not only an increase of the multiplicity of the wavelength division multiplexing but also a decrease of the multiplicity of the wavelength division multiplexing is long or is much variable, the optical module for generating the new optical signal or the package for driving the optical module is automatically started sequentially without requiring a complicated work.

According to a fifth aspect of the present invention, an initializing process which does not require a generation or output of the wavelength division multiplexed optical signal is excluded from the subject of the restriction.

Specifically, even when the number of the optical module for generating the new optical signal or packages for driving the corresponding optical module is plural and a time required to normally output optical signals by the corresponding optical module is much different, the initializing process of the packages is performed without the restriction.

Therefore, each package is quickly started as compared to the case in which the starting of the above-mentioned initializing process is restricted at the period.

According to a sixth aspect of the present invention, information individually applied to the starting of the respective packages is previously stored in a memory unit. The control unit provides a specific package with the information stored in the memory unit corresponding to the specific package to be the subject of the restriction or the release of the restriction.

Specifically, each package is started based on the information at the time of the restriction or the release of the restriction performed by the control unit.

Therefore, it is possible to simplify the control sequence related to the starting of the package and improve the performance and added value.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be described with reference to the accompanying drawings.

Figure 1:
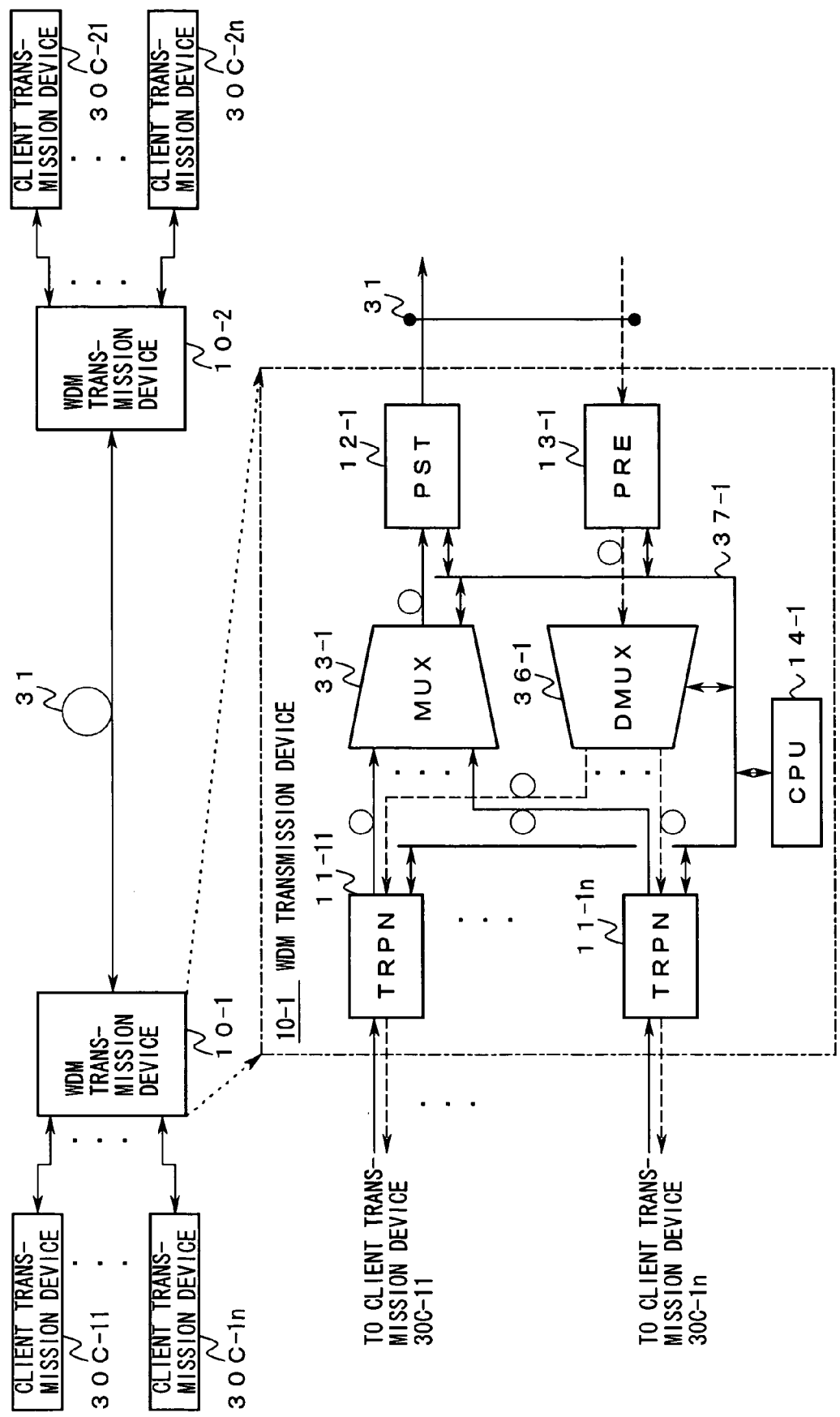
FIG. 1 is a diagram illustrating a first embodiment and a second embodiment of the present invention.

FIG. 1 is a diagram illustrating a first embodiment and a second embodiment of the present invention.

In FIG. 1, WDM transmission devices 10-1 and 10-2 are connected to one end and the other end of a full duplex optical transmission line 31, respectively. Client transmission devices 30C-11 to 30C-1n and client transmission devices 30C-21 to 30C-2n are connected to the WDM transmission devices 10-1 and 10-2, respectively.

In the WDM transmission device 10-1, transponder packages (TRPN) 11-11 to 11-1n are connected to the client transmission devices 30C-11 to 30C-1n, respectively. Optical output terminals of the transponder packages 11-11 to 11-1n are respectively connected to corresponding input terminals of a wavelength division multiplexer (MUX) 33-1, and an output terminal of the wavelength division multiplexer 33-1 is connected to one end of a downstream link of an optical transmission line 31 through a postpackage 12-1. One end of an upstream link of the optical transmission line 31 is connected to an optical input terminal of a prepackage 13-1, and an output terminal of the prepackage 13-1 is connected to an input terminal of a wavelength division demultiplexer (DMUX) 36-1. First to n-th output terminals of the wavelength division demultiplexer 36-1 are connected to optical input terminals of the transponder packages 11-11 to 11-1n, respectively. In addition, control terminals of the transponder packages 11-11 to 11-1n, the wavelength division multiplexer 33-1, the postpackage 12-1, the prepackage 13-1, and the wavelength division demultiplexer 36-1 are connected to a bus terminal of a processor 14-1 (CPU) through an internal bus 37-1.

In addition, a structure of the WDM transmission device 10-2 is the same as that of the WDM transmission device 10-1. Therefore, in the following description, constituent elements of the WDM transmission device 10-2 which is the same as those of the WDM transmission device 10-1 are denoted by the same reference numeral to which a first appended number '2' is attached and the description thereof is omitted.

In addition, in the following description, on common matters of the WDM transmission devices 10-1 and 10-2, their descriptions will be made using reference numerals to which an appended character 'C' that means falling under any one of first appended numbers '1' and '2' is attached as their first appended character.

In addition, in the following description, on common matters of transponder packages 11-C1 to 11-Cn, their descriptions will be made using reference numerals to which an appended character 'c' that means falling under any one of second appended numbers '1' to 'n' is attached as their second appended character.

First Embodiment

Figure 2:
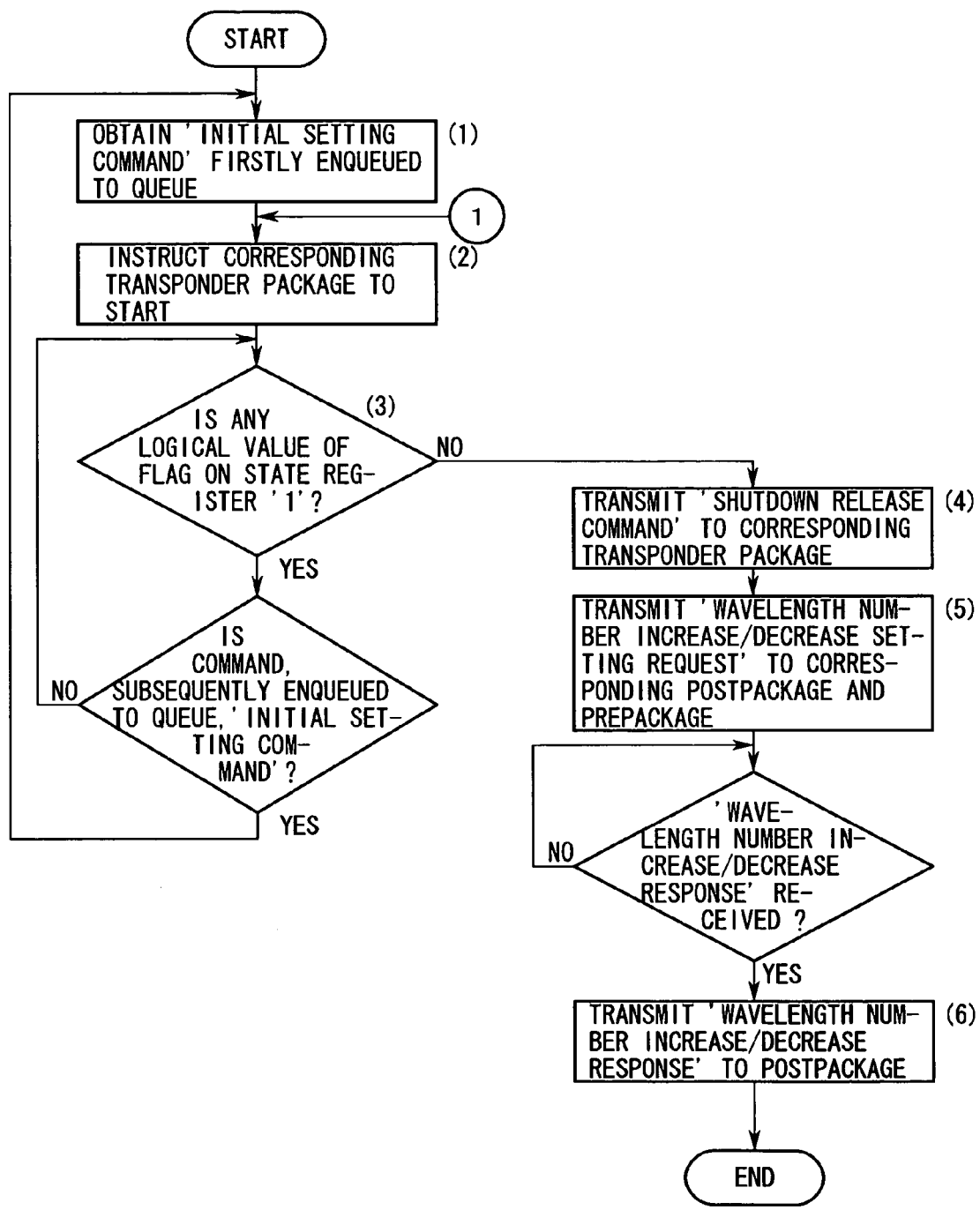
FIG. 2 is a flow chart of operation of the first embodiment of the present invention.

FIG. 2 is a flow chart of operation of a first embodiment of the present invention.

Figure 3:
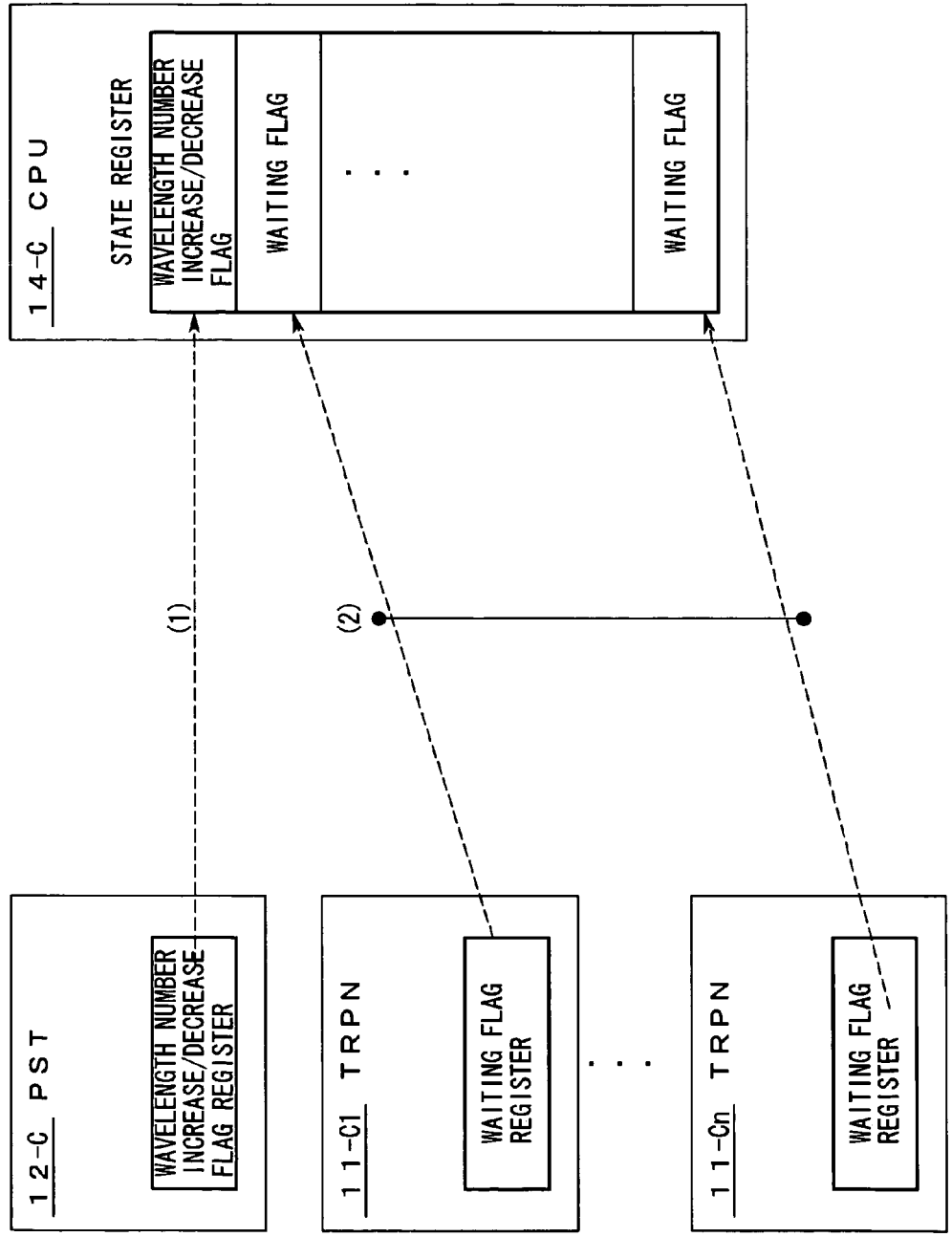
FIG. 3 is an explanatory diagram of operation of the first embodiment of the present invention.

FIG. 3 is an explanatory diagram of operation of the first embodiment of the present invention.

Figure 4:
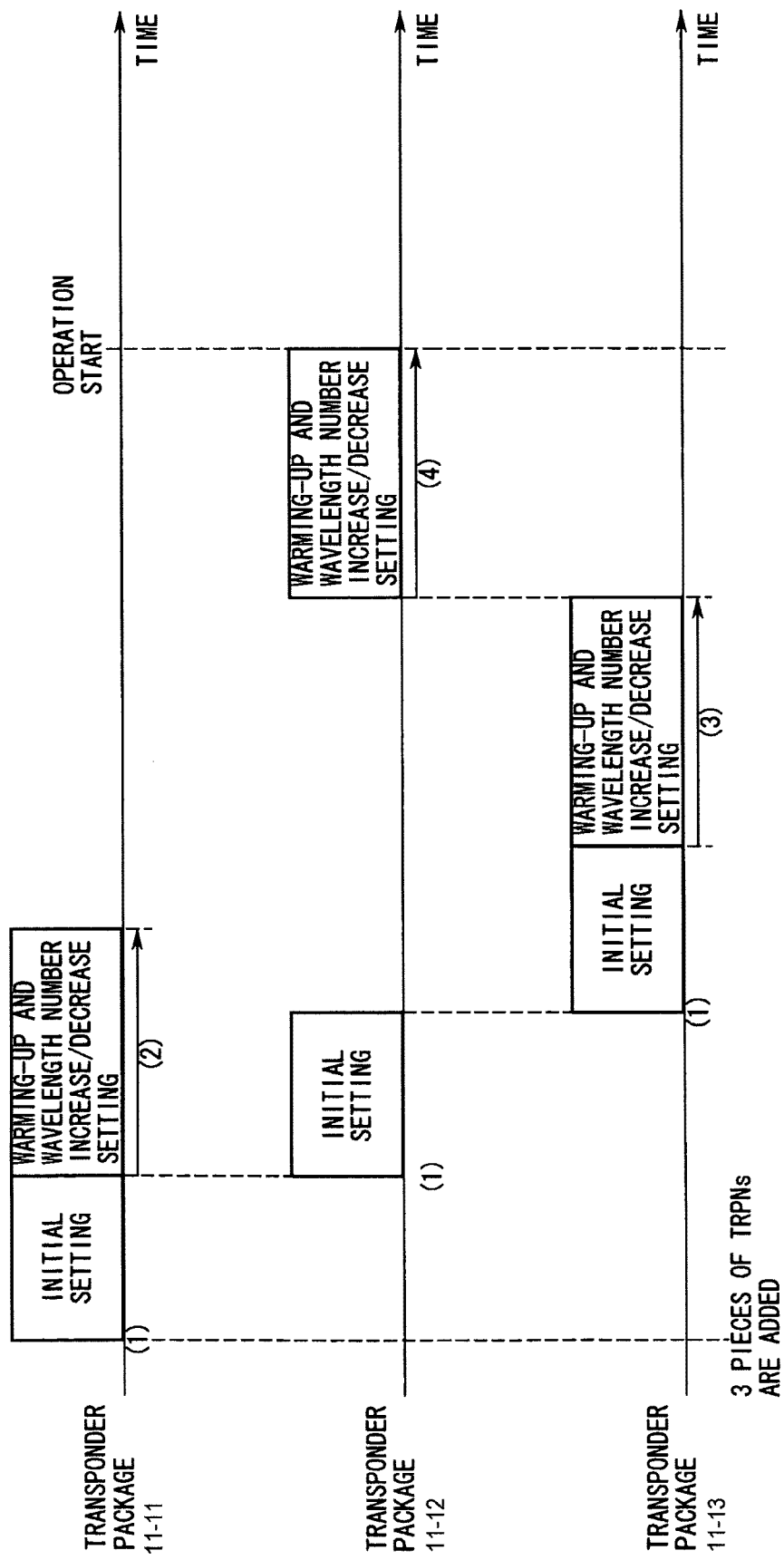
FIG. 4 is a time chart of operation of the first embodiment of the present invention.

FIG. 4 is a time chart of operation of the first embodiment of the present invention.

Hereinafter, an operation of a first embodiment of the present invention will be described with reference to FIGS. 1 to 4.

A feature of the present embodiment depends on a sequence of a process performed by a processor 14-C as described below. A basic operation of each unit is the same as that of the conventional example and thus the description thereof is omitted.

A postpackage 12-C has 'a wavelength number increase/decrease flag register' in which 'a wavelength number increase/decrease flag' is stored, as shown in FIG. 3. The wavelength number increase/decrease flag is set such that its logical value is '1' at 'a wavelength number increase/decrease setting period' related to any of the transponder packages 11-C1 to 11-Cn and its logical value is '0' at a period other than 'the wavelength number increase/decrease setting period'.

A transponder package 11-Cc has 'a waiting flag register' in which 'a waiting flag' is stored, as shown in FIG. 3. The waiting flag is set such that its logical value is '1' at 'a warming-up period' reaching from a time when a driving of a built-in optical module starts in accordance with 'a shutdown release command' to a time when an optical signal having a predetermined wavelength and level is normally output from the optical module and its logical value is '0' at a period other than 'the warming-up period'.

A predetermined storage region of a main memory of the processor 14-C has 'a state register' in which copies of 'the wavelength number increase/decrease flag register' of the postpackage 12-C and all 'the waiting flag registers' of the transponder packages 11-C1 to 11-Cn are stored, as shown in FIG. 3.

In addition, in the following description, it is assumed that all of 'the wavelength number increase/decrease flag register', 'the waiting flag register' and 'the state register' are arranged in a storage region of a nonvolatile memory.

By performing any of the below described a first or second monitoring, the processor 14-C stores the copies of 'the wavelength number increase/decrease flag register' of the postpackage 12-C and all 'the waiting flag registers' of the transponder packages 11-C1 to 11-Cn in 'the state register' ((1) and (2) of FIG. 3).

- A first monitoring for referring to 'the wavelength number increase/decrease flag register' of the postpackage 12-C and all 'the waiting flag registers' of the transponder packages 11-C1 to 11-Cn through the internal bus 37-1 at a predetermined period (for example, a period shorter than a shortest interval at which the above-mentioned 'wavelength number increase/decrease flag register' and 'waiting flag register' are updated).
- A second monitoring for obtaining update values of 'the waiting flag registers' notified independently by the transponder packages 11-C1 to 11-Cn and an update value of 'the wavelength number increase/decrease flag register' notified similarly independently by the postpackage 12-C.

The processor 14-C performs 'a mounting correspondence process' described below together with the first and second monitorings.

In addition, in the following description, it is assumed that the transponder package 11-C1 is newly mounted on the WDM transmission device in a state in which, for example, the transponder package 11-C1 is not mounted on the WDM transmission device among the transponder packages 11-C1 toll-Cn, and the postpackage 12-C and the prepackage 13-C normally operate together with the transponder packages 11-C2 to 11-Cn other than transponder package 11-C1.

In addition, in the course of the mounting correspondence process described below, a content of 'the state register' updated based on the monitorings is referred while a content of 'the waiting flag registers' included in the transponder packages 11-C1 to 11-Cn and a content of 'the wavelength number increase/decrease flag register' included in the postpackages 12-C are not directly referred.

(Sequence of Mounting Correspondence Process Performed by Processor 14-C)

(1) Whenever a new transponder package is mounted, 'an initial setting command' (including an identifier of the corresponding transponder package) instructed by an operator is enqueued sequentially to a queue (not shown).

(2) One 'initial setting command' firstly enqueued to the queue is obtained ((1) of FIG. 2) and the transponder package 11-C1 indicated by the identifier included in 'the initial setting command' is instructed to start, similarly to the conventional example ((2) of FIG. 2).

(3) Logical values of the copies of 'the wavelength number increase/decrease flag register' and all 'the waiting flag registers' stored in 'the state register' are referred and it is determined that any of the logical values is '1' ((3) of FIG. 2).

(4) It is identified through the determination that any of logical values of the copies of 'the wavelength number increase/decrease flag register' and all 'the waiting flag registers' is '1', and when 'an initial setting command' subsequently enqueued to the queue exists, a process (related to 'an initial setting command' of the other transponder package) subsequent to the process (2) is initiated, while when 'an initial setting command' subsequently enqueued to the queue does not exist, the process (3) is repeated without performing the following process.

(5) When it is identified through the determination that all the logical values of the copies of 'the wavelength number increase/decrease flag register' and all 'the waiting flag registers' is '0', 'a shutdown release command' (it is in place of 'the shutdown release command' instructed by an operator in the conventional example) is transmitted to the corresponding transponder package 11-C1 ((4) of FIG. 2) and a message (hereinafter, referred as to a wavelength number increase/decrease setting request) indicating the purport is transmitted to the postpackage 12-C and the prepackage 13-C ((5) of FIG. 2).

The transponder package 11-C1 updates the logical value of 'the waiting flag' as '1' in accordance with 'the shutdown release command', initiates the driving of the built-in optical module, and the logical value of 'the waiting flag' is set as '0' again at the time when an optical signal having a predetermined wavelength λ1 and level (an optical signal modulated with a signal supplied from the client transmission device 30C-C1) start to be output by the optical module.

When identifying 'the wavelength number increase/decrease setting request', the postpackage 12-C sets the logical value of 'the wavelength number increase/decrease flag' as '1' and notifies the other WDM transmission device connected through the downstream (upstream) link of the optical transmission line 31 of [the addition of the wavelength λ1 (herein, it is assumed that the wavelength λ1 is identified as information included in 'the wavelength number increase/decrease setting request') in a wavelength band].

The prepackage 12-C delivers to the processor 14-C a response (hereinafter, referred to as 'a wavelength number increase/decrease response', and it is assumed that the response is received through the upstream (downstream) link of the optical transmission line) to the notification of the addition of the wavelength λ1 from the other WDM transmission device.

The processor 14-C transmits 'the wavelength number increase/decrease response' to the postpackage 12-C1 ((6) of FIG. 2), and at the time of identifying 'the wavelength number increase/decrease response', the postpackage 12-C1 sets the logical value of 'the wavelength number increase/decrease flag' as '0' again.

Specifically, in all the transponder packages 11-C1 to 11-Cn, their initial settings are initiated according to the order of 'the initial setting commands' input by the operator ((1) of FIG. 4) and are performed individually keeping pace with each other, but the warming up of the optical module performed subsequent to the initial setting is automatically performed sequentially at a period at which the same warming up is not performed in any of the other transponder packages ((2), (3), and (4) of FIG. 4).

According to the present embodiment, even though the large variation occurs in the characteristics of the transponder packages 11-C1 to 11-Cn, 'the shutdown release commands' are generated without being delayed and requiring a labor of a human, with regard to all the transponder packages 11-C1 to 11-Cn.

Therefore, the initiation of the normal operation and the wavelength number increase/decrease setting according to the increase of the transponder packages can be achieved with a low cost and at a high speed.

In addition, in the present embodiment, after the transponder package 11-C1 is mounted, 'the initial setting command' is instructed by the operator.

However, when information that the transponder package 11-C1 is physically mounted through a plug is detected by hardware, 'the initial setting command' is automatically generated by the processor 14-C, so that the work related to the maintenance or operation may become more effective and simplified.

In addition, in the present embodiment, the generation of 'the shutdown release commands' to the increased transponder packages is suspendd until the copies (stored in 'the state register') of all the logical values of 'the waiting flags' of the transponder packages 11-C1 to 11-Cn and 'the wavelength increase/decrease setting flag' of the postpackage 12-C become '0'.

However, the present invention is not limited to the above-mentioned structure, and when the period at which the logical value of 'the wavelength increase/decrease setting flag' becomes '1' is much shorter than any of a shortest interval at which the transponder packages increase and a time necessary for the warming up performed by the transponder packages, 'the shutdown release commands' may be generated at the time at which the copies (stored in 'the state register') of the logical values of only all 'the waiting flags' of the transponder packages 11-C1 to 11-Cn become '0'.

In addition, in the present embodiment, the information included in 'the initial setting command' is not described in detail.

However, the information included in 'the initial setting command' has all of information (information previously supplied as office data and stored in a main memory and an external storage of the processor 14-C) which is referred and obtained in the course of starting and operating of the transponder packages 11-C1 to 11-Cn, so that the high speed response may be achieved with regard to the increase or exchange the transponder packages 11-C1 to 11-Cn.

Second Embodiment

Figure 5:
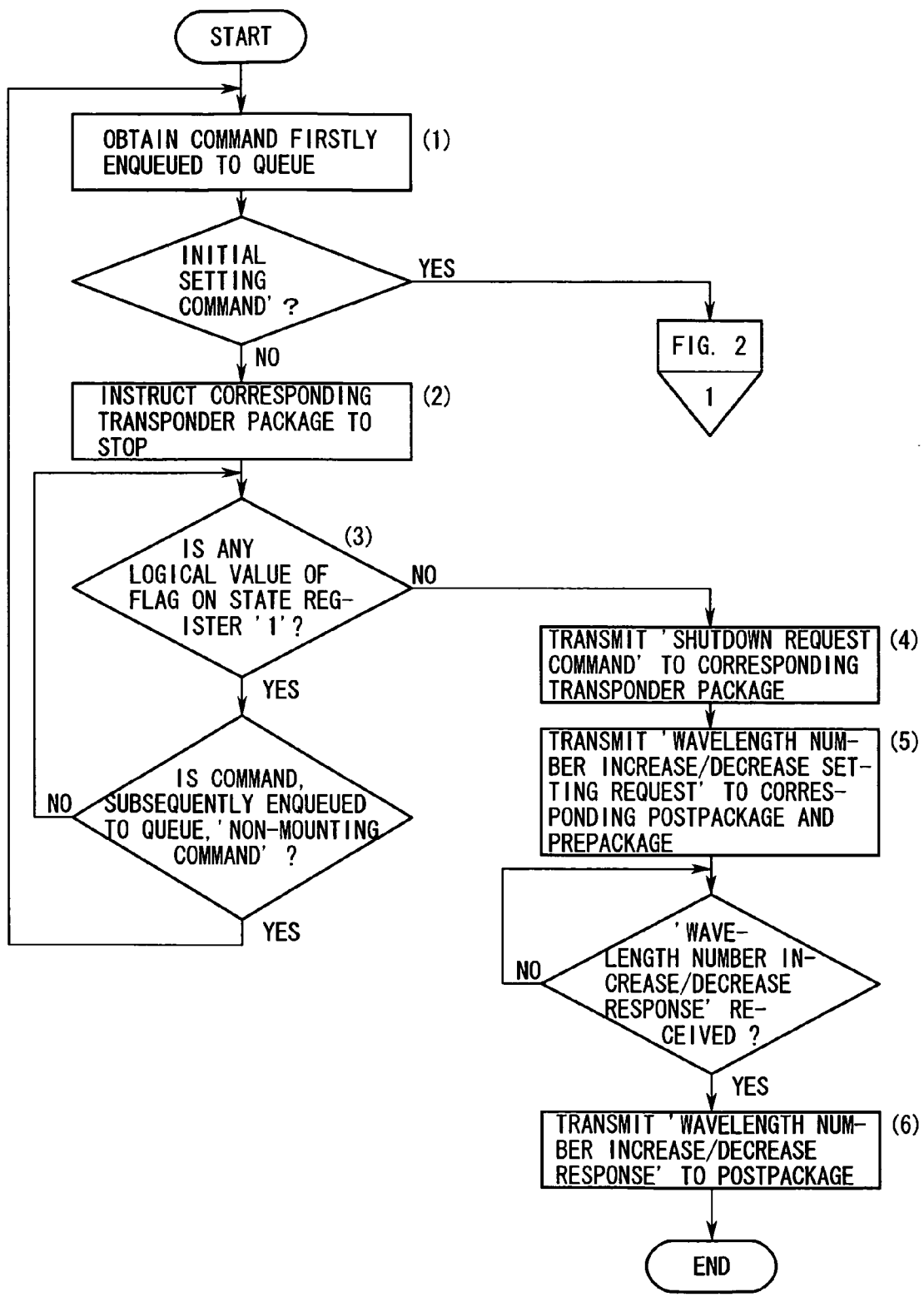
FIG. 5 is a flow chart of operation of the second embodiment of the present invention.
Figure 6:
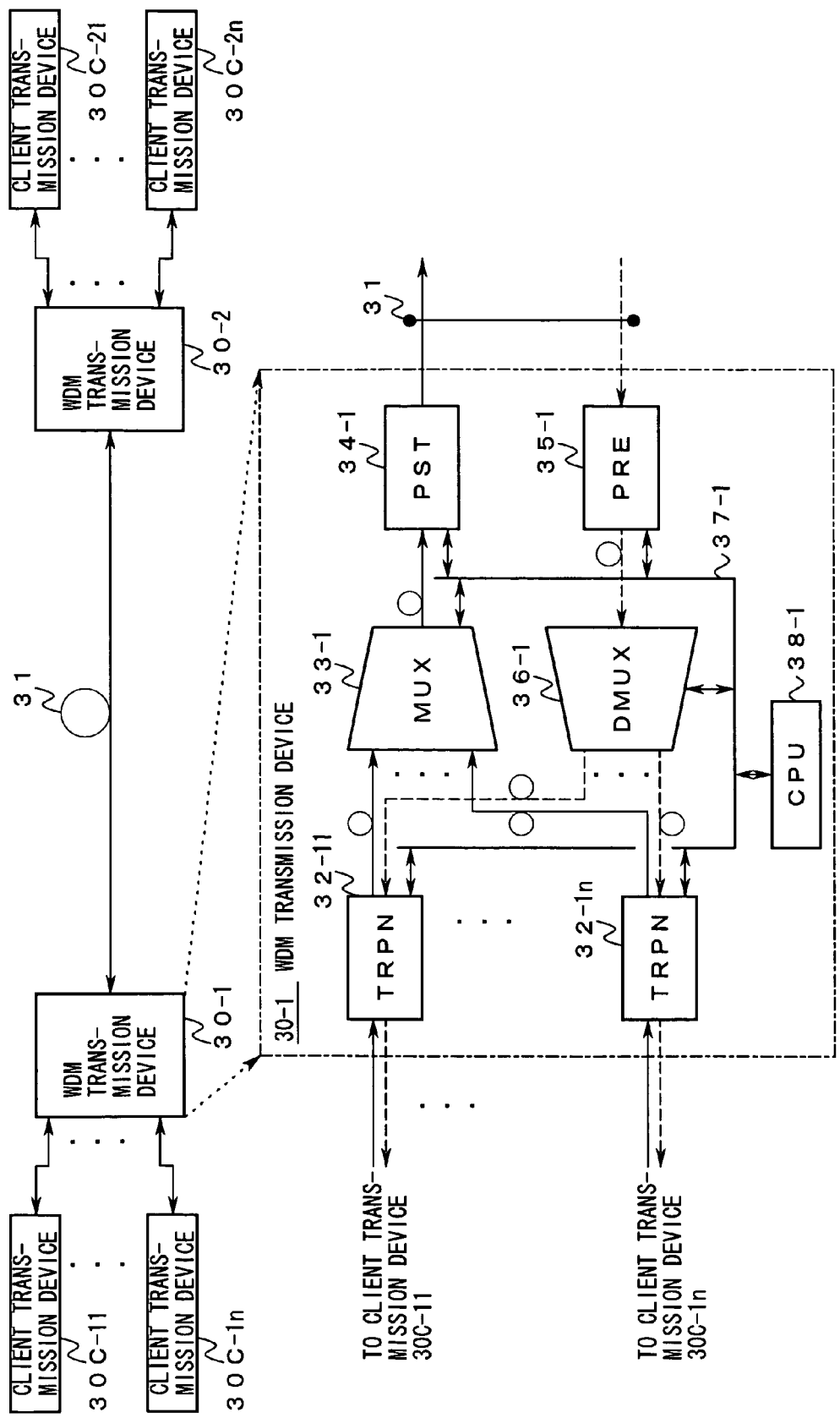
FIG. 6 is a diagram illustrating an example of a structure of an optical transmission system to which a wavelength division multiplexing is applied.
Figure 7:
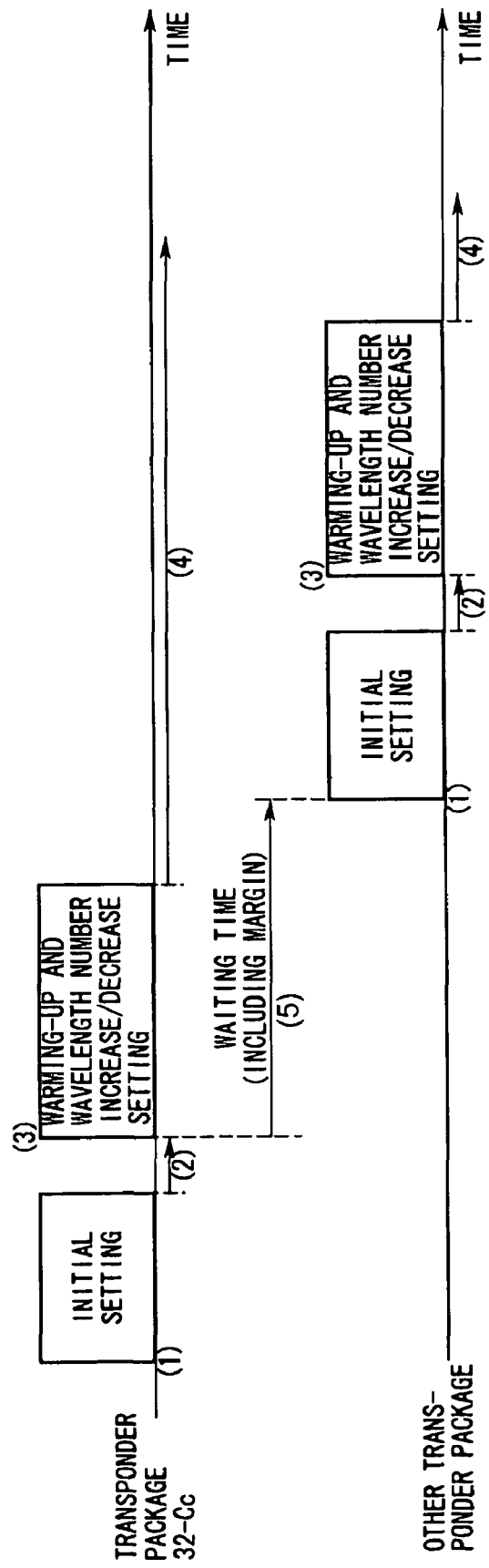
FIG. 7 is an explanatory diagram of operation of a conventional optical transmission system.

FIG. 5 is a flowchart of operation of a second embodiment of the present invention.

Hereinafter, a second embodiment of the present invention will be described with reference to FIG. 1.

The processor 14-C performs 'a non-mounting correspondence process' described below together with the first and second monitorings.

In addition, in the following description, it is assumed that for example, the transponder package 32-C1 is excluded from a system configuration in a state in which the postpackage 34-C and the prepackage 35-C normally operate together with the transponder packages 32-C1 to 32-Cn.

In addition, in the course of the non-mounting correspondence process described below, a content of 'the state register' updated based on the monitorings is referred while a content of 'the waiting flag registers' included in the transponder packages 11-C1 to 11-Cn and a content of 'the wavelength number increase/decrease flag register' included in the postpackages 12-C are not directly referred.

(Sequence of Non-Mounting Correspondence Process Performed by Processor 14-C)

(1) Whenever any transponder package is excluded from the system configuration, 'a non-mounting command' (including an identifier of a corresponding transponder package) instructed by an operator is enqueued sequentially to the queue (not shown).

(2) 'One command' firstly enqueued to the queue is obtained ((1) of FIG. 5) and when the one command corresponds to 'the initial setting command', 'the mounting correspondence process' is performed based on the same sequence as that of the first embodiment.

(3) However, when the command obtained in this manner corresponds to 'the non-mounting command', the stop of the transponder package 11-C1 is instructed to the transponder package 11-C1 indicated by an identifier included in 'the non-mounting command' ((2) of FIG. 5).

(4) Logical values of all the copies of 'the wavelength number increase/decrease flag register' and 'the waiting flag registers' stored in 'the state register' are referred and it is determined that any of the logical values is '1' ((3) of FIG. 5).

(5) It is identified through the determination that any of logical values of all the copies of 'the waiting flag registers' and 'the wavelength number increase/decrease flag register' is '1', and when a command subsequently enqueued to the queue corresponds to 'a non-mounting command', a process (related to 'an non-mounting command' of the other transponder packages) subsequent to the process (2) is initiated, while when a command subsequently enqueued to the queue is not 'the non-mounting command', the process (4) is repeated without performing the following process.

(6) When it is identified through the determination that all the logical values of the copies of 'the waiting flag registers' and 'the wavelength number increase/decrease flag register' are '0', 'a shutdown request command' is transmitted to the corresponding transponder package 1'-C1 ((4) of FIG. 5) and a message (hereinafter, referred as to a wavelength number increase/decrease setting request) indicating the purport is transmitted to the postpackage 12-C and the prepackage 13-C ((5) of FIG. 5).

The transponder package 11-C1 updates the logical value of 'the waiting flag' as '1' in accordance with 'the shutdown request command', stops the driving of the built-in optical module, and sets the logical value of 'the waiting flag' as '0' again at the time when a level of the optical signal output from the optical module is lower than a defined lower limit.

When identifying 'the wavelength number increase/decrease setting request', the postpackage 12-C sets the logical value of 'the wavelength number increase/decrease flag' as '1' and notifies the other WDM transmission device connected through the downstream (upstream) link of the optical transmission line 31 of [the removal of the wavelength λ1 (herein, it is assumed that the wavelength λ1 is identified as information included in 'the wavelength number increase/decrease setting request') in a wavelength band].

The prepackage 12-C delivers to the processor 14-C a response (hereinafter, referred to as 'a wavelength number increase/decrease response', and it is assumed that the response is received through the upstream (downstream) link of the optical transmission line) to the notification of the removal of the wavelength λ1 from the other WDM transmission device.

The processor 14-C transmits 'the wavelength number increase/decrease response' to the postpackage 12-C1 ((6) of FIG. 5), and at the time of identifying 'the wavelength number increase/decrease response', the postpackage 12-C1 sets the logical value of 'the wavelength number increase/decrease flag' as '0' again.

Specifically, in all the transponder packages 11-C1 to 11-Cn, their operation stops are initiated according to the order of 'the non-mounting commands' input by the operator and are performed individually keeping pace with each other, but the stops of the driving of the optical modules in the course of the operation stops are automatically performed sequentially at a period at which the same driving stop is not performed in any of the other transponder packages.

According to the present embodiment, even though the large variation occurs in the characteristics of the transponder packages 11-C1 to 11-Cn, 'the shutdown request commands' are generated without being delayed and requiring a labor of a human, with regard to all the transponder packages 11-C1 to 11-Cn.

Therefore, the normal operation stop of the corresponding transponder package and the wavelength number increase/decrease setting according to the non-mounting or exchange of the transponder package can be achieved with a low cost and at a high speed.

In addition, in the present embodiment, the above-mentioned non-mounting correspondence process is performed when the transponder package 11-C1 is excluded from the system configuration in a state in which the transponder package 11-C1 is physically mounted.

However, even when the transponder package 11-C1 is physically not mounted so that the transponder package 11-C1 is excluded from the system configuration, the non-mounting correspondence process can be performed by a configuration described below, similarly to the above-mentioned description.

The logical value of 'the waiting flag' of the transponder package which is physically not mounted is analogously set as '0' by the hardware or is read as '0' by the processor 14-C as logical product with 'a mask pattern given as binary information corresponding to the transponder package which is not mounted'.

The delivering of 'the non-mounting command' and 'the shutdown request command' to the transponder package which is physically not mounted is omitted by the processor 14-C or 'the non-mounting command' and 'the shutdown request command' become invalid by the hardware.

In addition, in the above-mentioned embodiments, the optical module to be a subject of the warming up is built in the transponder package 11-Cc.

However, the optical module may be included not in the transponder package 11-Cc but in the wavelength division multiplexer 33-C, for example.

In addition, when information indicating the period of the warming up of the optical module is delivered through a metallic transmission line in place of the optical transmission line 31, the optical module may be included in the other transmission device opposite to the existing transmission device through the metallic transmission line.

In the above-mentioned embodiments, the logical value of 'the waiting flag' is set as '1' by the transponder package 11-Cc in accordance with 'the shutdown release command'.

However, when a time necessary for 'the initial setting' performed in the transponder package 11-Cc is much shorter than the time necessary for 'the warming up' or when the delay of the starting due to the performing of 'the initial setting' immediately before 'the warming up' is allowed, the logical value of 'the waiting flag' may be set as '1' at the time when 'the initial setting command' is given.

The invention is not limited to the above embodiments and various modifications may be made without departing from the spirit and scope of the invention. Any improvement may be made in part or all of the components.

What is claimed is:

1. A package starting control device comprising:
    a monitoring unit monitoring operational states of optical modules included in packages, each optical module of which generates an optical signal which is subjected to a wavelength-division-multiplexing to form a wavelength division multiplexed optical signal and, the monitoring unit monitoring an operational state of a transmission unit transmitting the wavelength division multiplexed optical signal to an optical transmission line, and detecting a specific optical module included in a package which is not mounted or is excluded from a system configuration, out of the optical modules whose operational states are monitored; and
    a control unit restricting output of the optical signals from the packages that include the optical modules that generate the optical signals further subjected to a wavelength-division-multiplexing to form the wavelength division multiplexed optical signals during a period in which an operational state of at least one of the packages including optical modules monitored by the monitoring unit is not in a steady state, and the control unit suspends the release of the restriction until the operational state of the transmission unit becomes the steady state when the specific optical module is detected by the monitoring unit, and the control unit releasing the restriction, made by the at least one package, on the output of the optical signals to all of the packages when the period elapses; and
    a memory unit in which information individually applied to the starting of the respective packages is previously stored, and wherein
    the control unit provides a specific package to be the subject of the restriction or the release of the restriction, with the information stored in the memory unit corresponding to the specific package.

2. The package starting control device according to claim 1, wherein
    an initializing process, in which the wavelength division multiplexed optical signal is not generated or output, is excluded from the subject of the restriction.

3. A package starting control device comprising:
    a monitoring unit monitoring operational states of optical modules included in packages, each optical module of which generates an optical signal which is subjected to a wavelength-division-multiplexing to form a wavelength division multiplexed optical signal and, the monitoring unit monitoring an operational state of a transmission unit transmitting the wavelength division multiplexed optical signal to an optical transmission line, and detecting a specific optical module included in a package which is not mounted or is excluded from a system configuration, out of the optical modules whose operational states are monitored; and
    a control unit restricting driving of the optical modules by packages which drive the optical modules that generate optical signals further subjected to a wavelength-division-multiplexing to form the wavelength division multiplexed optical signals during a period in which an operational state of at least one of the packages including optical modules monitored by the monitoring unit is not in a steady state, and the control unit suspends the release of the restriction until the operational state of the transmission unit becomes the steady state when the specific optical module is detected by the monitoring unit, and the control unit releasing the restriction, made by the at least one package, on the driving of the optical modules to all of the packages when the period elapses; and
    a memory unit in which information individually applied to the starting of the respective packages is previously stored, and wherein
    the control unit provides a specific package to be the subject of the restriction or the release of the restriction, with the information stored in the memory unit corresponding to the specific package.

4. The package starting control device according to claim 3, wherein
    an initializing process, in which the wavelength division multiplexed optical signal is not generated or output, is excluded from the subject of the restriction.

* * * * *